(12) United States Patent
Leder et al.

(10) Patent No.: US 11,544,436 B1
(45) Date of Patent: Jan. 3, 2023

(54) HARDWARE-SOFTWARE INTERACTION TESTING USING FORMAL VERIFICATION

(71) Applicant: Amazon Technologies, Inc., Seattle, WA (US)

(72) Inventors: Uri Leder, Lotem (IL); Ori Cohen, Atlit (IL); Benzi Denkberg, Etz Efraim (IL); Max Chvalevsky, Mevaseret Zion (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/353,715

(22) Filed: Jun. 21, 2021

(51) Int. Cl.
*G06F 30/3323* (2020.01)
*G01R 31/317* (2006.01)
*G06F 30/31* (2020.01)
*G06F 117/08* (2020.01)

(52) U.S. Cl.
CPC ... *G06F 30/3323* (2020.01); *G01R 31/31704* (2013.01); *G06F 30/31* (2020.01); *G06F 2117/08* (2020.01)

(58) Field of Classification Search
None
See application file for complete search history.

(56) References Cited

U.S. PATENT DOCUMENTS

| | | | |
|---|---|---|---|
| 9,021,409 | B2 | 4/2015 | Vasudevan et al. |
| 10,002,252 | B2 | 6/2018 | Ismael et al. |
| 10,580,511 | B2 * | 3/2020 | Darbari ........... G11C 29/38 |
| 11,250,927 | B2 * | 2/2022 | Darbari ........... G06F 11/3037 |
| 2020/0185051 | A1 | 6/2020 | Darbari et al. |

* cited by examiner

*Primary Examiner* — Leigh M Garbowski
(74) *Attorney, Agent, or Firm* — S. Scott Foster; Kowert, Hood, Munyon, Rankin & Goetzel, P.C.

(57) ABSTRACT

Hardware-software interaction testing is performed using formal verification for language-specified hardware designs. A description of valid access using an interface for a configuration space of a language specified hardware design and a description of a valid output of the language-specified hardware design is received. Formal verification is performed on the language-specified hardware design using the interface for the configuration space according to the description of valid access using the interface. A sequence of access to the configuration space using the interface that causes a failure to produce the valid output of the language-specified hardware design according to the description of valid output to identify as an error for the language-specified hardware design.

20 Claims, 7 Drawing Sheets

US 11,544,436 B1

HARDWARE-SOFTWARE INTERACTION TESTING USING FORMAL VERIFICATION

BACKGROUND

Formal verification provides a cost effective design tool when implementing different hardware solutions. A formal verification system may generate a mathematical model or representation of a hardware design, then determine whether a proof exists or can be generated that solves the mathematical model (e.g., by providing a proof to demonstrate correctness of a finite state machine). If a proof exists, then it can be assured that the hardware design is logically sound (although further testing for physical implementation features, such as component layout to account for On-Chip Variation and other physically occurring conditions may still be performed). In this way, problems in the hardware design can be identified.

Figure 1:
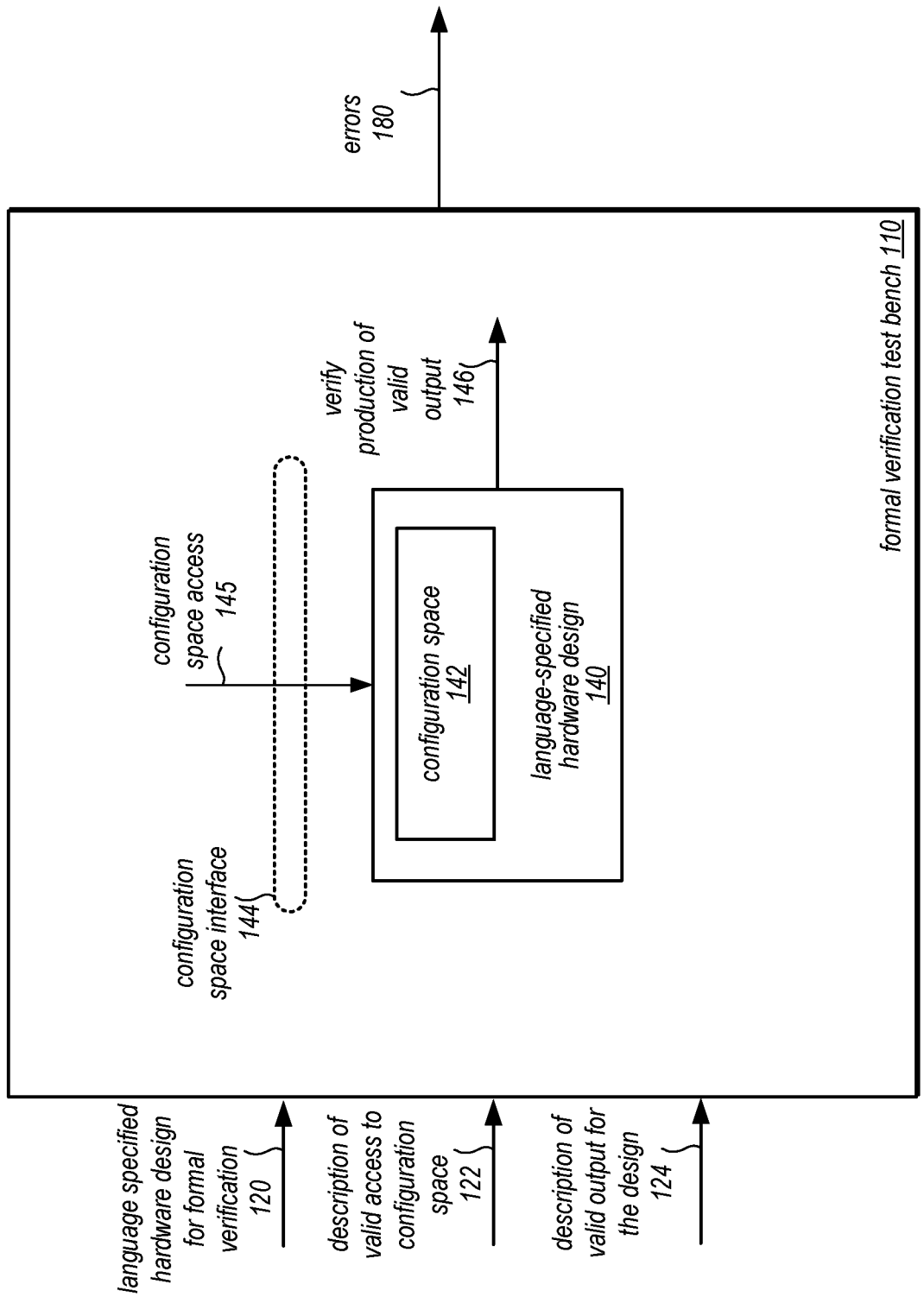
FIG. 1 illustrates a logical block diagram of hardware-software interaction testing using formal verification, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various techniques of hardware-software interaction testing using formal verification are described herein. Formal verification techniques offer cost effective verification when designing new hardware. Techniques that can increase the utilization of formal verification systems may reduce design and development costs, decrease the number of undetected bugs, errors, or design flaws, and thus such techniques may be highly desirable.

For example, in various embodiments, hardware designs may contain a configuration space. In some embodiments, this configuration space may be implemented using registers and/or other components which may allow for external components (e.g., software) to configure, provide information to, and/or otherwise alter the operation of the hardware design. Configuration registers can be accessed via software and be changed via software, in some embodiments. In this way, the configuration registers can provide an interface between hardware and software. For instance, while the hardware design is working, the hardware design's behavior may depend on those registers and changes if the registers are changed by the software.

Configuration space of a hardware design may be accessed in many ways. For example, in some embodiments an interface to the configuration space may be implemented according to a protocol like, for example, the Advanced Peripheral Bus (APB) protocol in order to initiate and perform various accesses (e.g., reads or writes) to the configuration space. Various other protocols or other access techniques that provide an interface to interact with the configuration space may be implemented in other embodiments.

Access to configuration space may be performed, in some embodiments, to alter and/or obtain various values in the configuration space. For example, an APB transaction may be an access that is a well ordered sequence of hardware signals. The signals in such transactions may be, for example, "address" which may indicate which portion of the configuration space (e.g., which register) to access and may be "data," which indicates what will be the next "value" of that portion (e.g., register) of the configuration space. In some protocols or other interfaces, the very access to the portion of the configuration space may alter the configuration space (e.g., by altering values of other registers).

Errors may be caused, in various embodiments, by access(es) to the configuration space, which may result in a hardware design failing to produce valid output (e.g., erroneous output, delayed output, or no output). While some errors may be provoked by randomly or otherwise innocently occurring accesses in the configuration space, in some circumstances, other errors may actually expose security weaknesses in a hardware design which may be exploited by malicious users. For example, for hardware designs implemented as part of host systems that support different users executing different processes (which may be operating in multi-tenant fashion on the host system whereby the host system guarantees isolation between the different uses so that one process for one user does not access data of or interfere with the execution of another process for another user), a malicious user could interfere with the operation of the hardware design for another user on the host system (e.g., by halting, freezing, or otherwise stopping operation of the hardware design on behalf the other user due to an error caused by a write to the configuration space) through a security weakness in the configuration space of the hardware design. Such errors may be considered security breaches that cause a "denial of service" error. For example, a denial of service error may occur when the hardware becomes stuck and cease to execute anything.

Errors caused by accesses to a configuration space may be difficult to resolve, (e.g., by relying upon disruptive corrective actions, like restarting a device that includes the hardware). Such errors may, as in the example case of several users which are independently using the same hardware given above, provide malicious users with the ability to affect other users by causing them to fail to obtain correct operation of the hardware device as no valid output of the device may be provided, resulting in a denial of the service provided using that hardware device.

The complexity of hardware designs when considered with respect to the possible accesses of the configuration space in hardware designs may make it difficult, if not impossible, to manually identify when some (or all) errors may be caused. In order to prevent errors that cause security or other problems, techniques of hardware-software interaction testing using formal verification may be implemented as described in detail below to evaluate the number of possible accesses, the order of such possible accesses, the number of possible values and the coordination between the access and current hardware state, all of which may affect the outcome, and only a small amount of them can cause an actual error. A sequence of accesses to configuration space may be identified that causes an error, such as one or more errors 180 in FIG. 1, so that resolution of such an error (e.g., by preventing or otherwise blocking an identified access sequence from occurring) may be performed.

FIG. 1 illustrates a logical block diagram of hardware-software interaction testing using formal verification, according to some embodiments. A formal verification system such as system verification application 210 discussed below with regard to FIG. 2, may perform formal verification techniques using a formal verification test bench 110 or other formal verification task (as discussed in detail below with regard to FIG. 3) on a hardware design described according to a hardware language (e.g., such as hardware description languages like VHDL, Verilog, and RHDL, among others), such as language specified hardware design 120. For example, the language-specified hardware design 140 may be included in formal verification test bench 110, as indicated at 120, which includes various features or components to perform various operations, which may result in operations including providing output. Language-specified hardware design 140 may include a configuration space 142, such as one or more configuration registers, which may be accessed via a configuration space interface 144. For example, as discussed above, a protocol such as APB can be used to implement transactions to perform configuration space access, as indicated at 145.

As indicated at 122, a description of valid access to a configuration space may be included in formal verification test bench 110, in some embodiments. For example, the description of valid access may be specified as one or more assumptions which indicate allowable locations or portions of configuration space 142 to write and/or read using configuration space 144, allowable sequences for performing accesses, and/or allowable data values to write. As indicated at 124, a description of valid output for hardware design may be included. For example, the description of valid output may be specified as one or more assertions which can be verified 146 by formal verification techniques according to various sequences of configuration space access 145.

The language-specified design for formal verification, as indicated 120, the description of valid access to configuration space, as indicated at 122, and the description of valid output for the hardware design, as indicated at 124, may be specified according to various different types of interfaces for formal verification systems that will perform formal verification tasks, such as formal verification test bench 110. For example, a command line interface, programmatic interface, and/or graphical user interface (as discussed with regard to FIGS. 4A-4B below) may support receiving such information and other interactions. For example, the interface may allow a user to request execution of verification and/or configure how the verification is performed (e.g., whether or not to use a register combination analysis as discussed below with regard to FIG. 6).

As discussed in detail below with regard to FIGS. 2-6, a formal verification system may perform various formal verification techniques to implement configuration space access verification. For example, formal verification techniques implemented by formal verification system 110 may utilize inputs and/or internal variables for the hardware design being tested (e.g., the language-specified hardware design) have some constraints which may be specified by one or more assumptions and one or more checks for validity on outputs or internal variables of the hardware design being tested specified by one or more assertions, in some embodiments. Formal verification techniques may translate or represent the assumptions, assertions, and other aspects of the language-specified hardware design as mathematical equations which can then be analyzed to identify if there is a sequence that creates a scenario that violates an assertion.

Please note that the previous description of a formal verification test bench, language-specified hardware design, including the number and/or configuration of components, such as configuration space 142, and interactions to provide language specified hardware designs and descriptions is merely provided as an example of hardware-software interaction testing using formal verification. Different numbers of components or configuration of components may be implemented.

This specification begins with general descriptions of a system verification application, which may implement hardware-software interaction testing using formal verification. Various examples of different components/modules, or arrangements of components/modules that may be implemented in the system verification application may then be discussed. A number of different methods and techniques to implement hardware-software interaction testing using formal verification are then discussed, some of which are illustrated in the accompanying flowchart. Various examples are provided throughout the specification.

Figure 2:
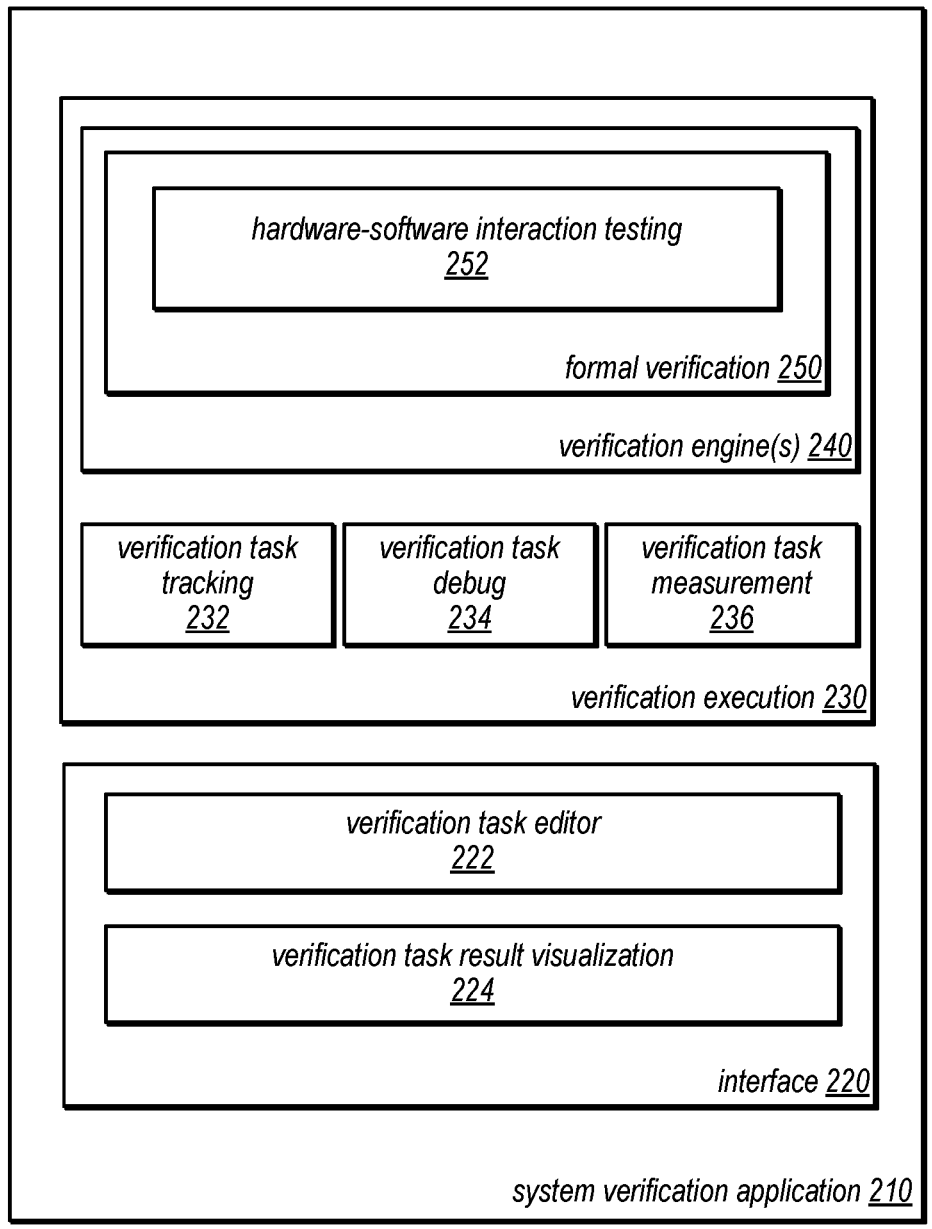
FIG. 2 is a logical block diagram illustrating a system verification application that may implement hardware-software interaction testing using formal verification, according to some embodiments.

FIG. 2 is a logical block diagram illustrating a system verification application that may implement hardware-software interaction testing using formal verification, according to some embodiments. System verification application 210 may provide a set of verification tools or functions (or may be implemented as part of a larger Integrated Development Environment (IDE)) to perform, among other operations, the development and verification of hardware designs via various verification engine(s) 250 to determine a language-specified hardware design. System verification application 210 may implement various features, such as interface 220 and verification execution 230, which may be used to perform various interactive compilation techniques.

For example, interface 220 may be a programmatic interface implementing one or multiple Application Programming Interfaces (APIs) to invoke different operations, including compilation, a GUI interface that provides various visual control elements for editing, compiling, or other development activities, and/or a command line interface, which may also provide command line controls to edit, compile, or perform other development, design, and/or verification activities. In some embodiments, interface 220 may act as a control console that allows for the configuration of system verification application 210 features. For instance, interface 220 may support requests to configure various parameters or options of verification execution 230 (or verification engine(s) 240), such as the hardware language, assertions, assumptions, cover features, or other criteria or information for performing various verification techniques, such as for formal verification 250. Like FIGS. 4A-4B below, interface 220 may provide input support for editing verification tasks, (including code, scripts, or visual objects that represent the operations of a verification task performed by one of verification engine(s) 240). For example, interface 220 may implement verification task editor 222, which may allow a user to specify various features, criteria, or parameters for different types of verification tasks implemented by different verification engine(s) 240, such as hardware-software interaction testing 252 implemented as part of formal verification 250.

Interface 220 may also implement verification task result visualization 224. Different kinds of verifications, supported by verification engine(s) 240, may result in different types of visualizations for the verification task results. For example, paths through a logical block diagrams may be illustrated to identify a path in a hardware design with an error, or state tables may indicate when erroneous or invalid states are achieved by a hardware design. In at least some embodiments, verification task result visualization 224 may support indicating configuration space errors for hardware-software interaction testing 252 (and successes in some embodiments), as discussed above with regard to FIG. 1 and below with regard to FIGS. 3-6.

System verification application 210 may implement verification execution 230, which may support a common feature set (in addition to interface 220) across multiple different types of verifications supported by different verification engines. For instance, verification task tracking 232 may provide a common interface for identifying verification task milestones, estimates, or other tracking features. Verification task debug 234 may implement various debug tools for tracing errors, identifying alternatives or errors proactively (e.g., prior to test), as well as different linking errors in visualizations to error definitions for different verification engine 240 operations, in some embodiments. In some embodiments, verification task measurement 236 may provide performance metrics, benchmarks, or other assessments of hardware designs under verification. As noted above, different types of verification techniques are supported by verification engines 240. For example, verification engine(s) 240 may provide for formal verification 250 and static verification, design simulation verification, design emulation verification, and hardware prototyping (e.g., for FPGAs), among other verification engine(s) 240. As discussed in detail above with regard to FIG. 1 and below with regard to FIGS. 3-6, hardware-software interaction testing 252 may be implemented to detect configuration space errors caused by access(es) to a configuration space of a design under test using formal verification 250.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes) as part of a service, each of which may be similar to the computer system embodiment illustrated in FIG. 7 and described below, in one embodiment. In various embodiments, the functionality of a given system or service component (e.g., a component of system verification application 210) may be implemented by a particular node or may be distributed across several nodes). In some embodiments, a given node may implement the functionality of more than one service system component (e.g., more than one development application component).

Figure 3:
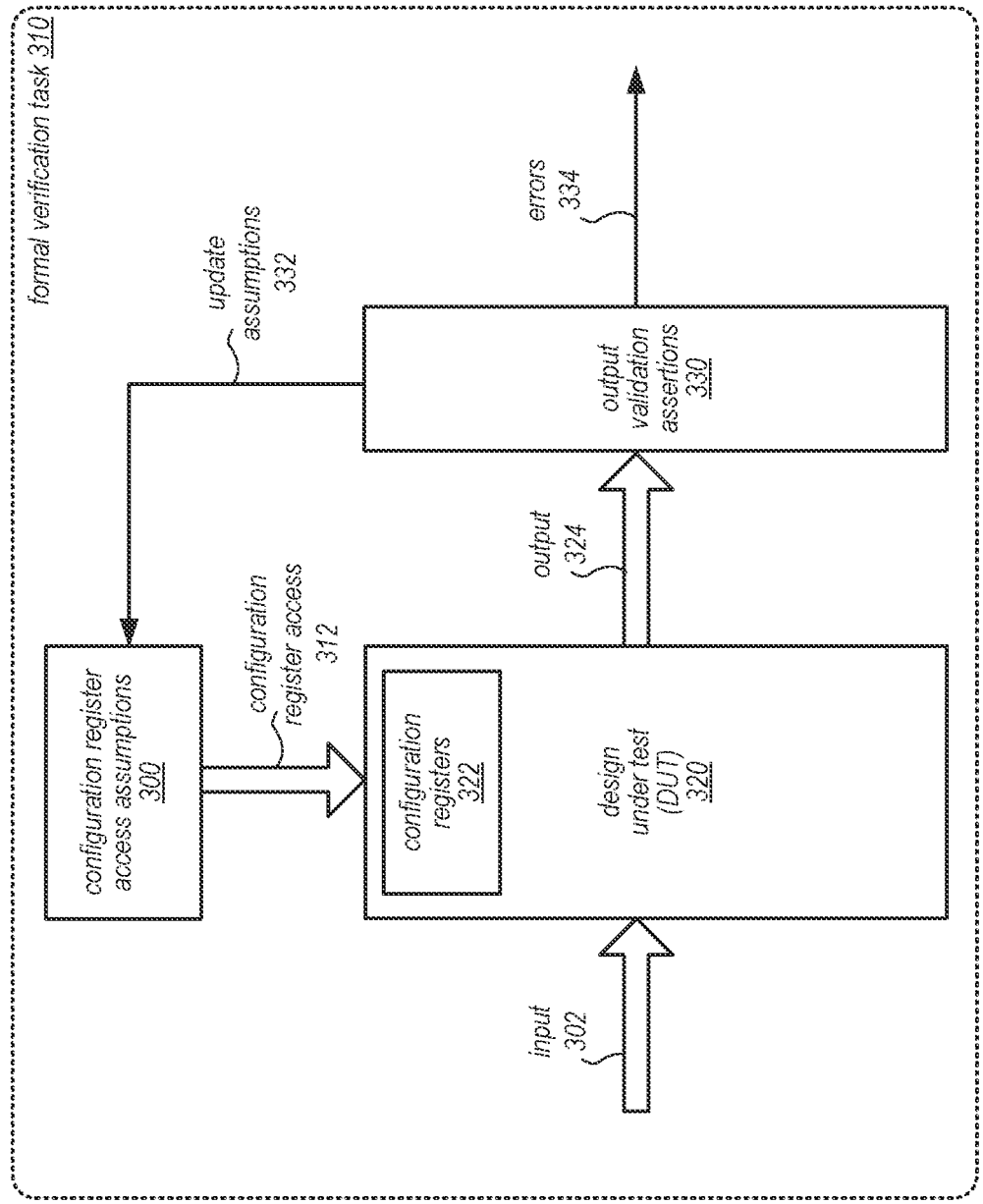
FIG. 3 is a logical block diagram illustrating a verification task created by a system verification application that tests access to configuration registers of a hardware design under test using formal verification, according to some embodiments.

FIG. 3 is a logical block diagram illustrating a verification task created by a system verification application that tests access to configuration registers of a hardware design under test using formal verification, according to some embodiments. Formal verification task 310 (e.g., a formal verification work bench) may be similar to formal verification tasks discussed below with regard to FIGS. 4A-6, in that it may support the performance of testing access to a configuration space of a hardware design. Design under test (DUT) 320 may be, in some embodiments, the design as specified according to the various different hardware languages as discussed above with regard to FIG. 1. As part of the various hardware components that make up DUT 320, one or more configuration registers 322 may be implemented. Configuration registers 322 may modify the operation of DUT 320 (e.g., by enabling or disabling certain features of DUT 320) or provide information to DUT 320 (e.g., by writing or updating lookup tables or other parameter values used for different operations in DUT 320).

Formal verification task 310 may allow for the formal verification of various input 302 to produce output 324 as processed through the various features or components of DUT 320 according to the configuration of DUT 320 as described in configuration registers 322. Formal verification task 310 may also use formal verification to verify the various possible combinations of one (or more) configuration registers 322, sequences of accessing configuration registers 322, and/or values that may be stored to or read from configuration registers 322. Configuration register access 322 may be verified according to configuration register access assumptions 300, which as discussed above (and below) may be provided to describe the allowed, enabled, supported, or otherwise enabled access 312 to configuration registers 312.

Formal verification task 310 may include output validation assertions 330, which may be used to assess the output 324 (e.g., identify produced output that is erroneous, failure to produce any output, or other failures to produce valid output). Output validation assertions 330, as discussed above (and below) may be provided to describe the expected, allowed, supported, or otherwise correct output.

In some embodiments, formal verification task 310 may incorporate detected errors into configuration access assumptions. In this way, formal verification may continue (or restart), with the sequence of access that caused the configuration blocked from performance, and allow for other errors which could then be produced in view of the updated assumptions 332 to be discovered. Thus, as indicated at 332, assumptions to remove errors may be provided as an update to configuration register access assumptions 300. In some embodiments, errors 334 may also be provided as an output or result.

Figure 4A:
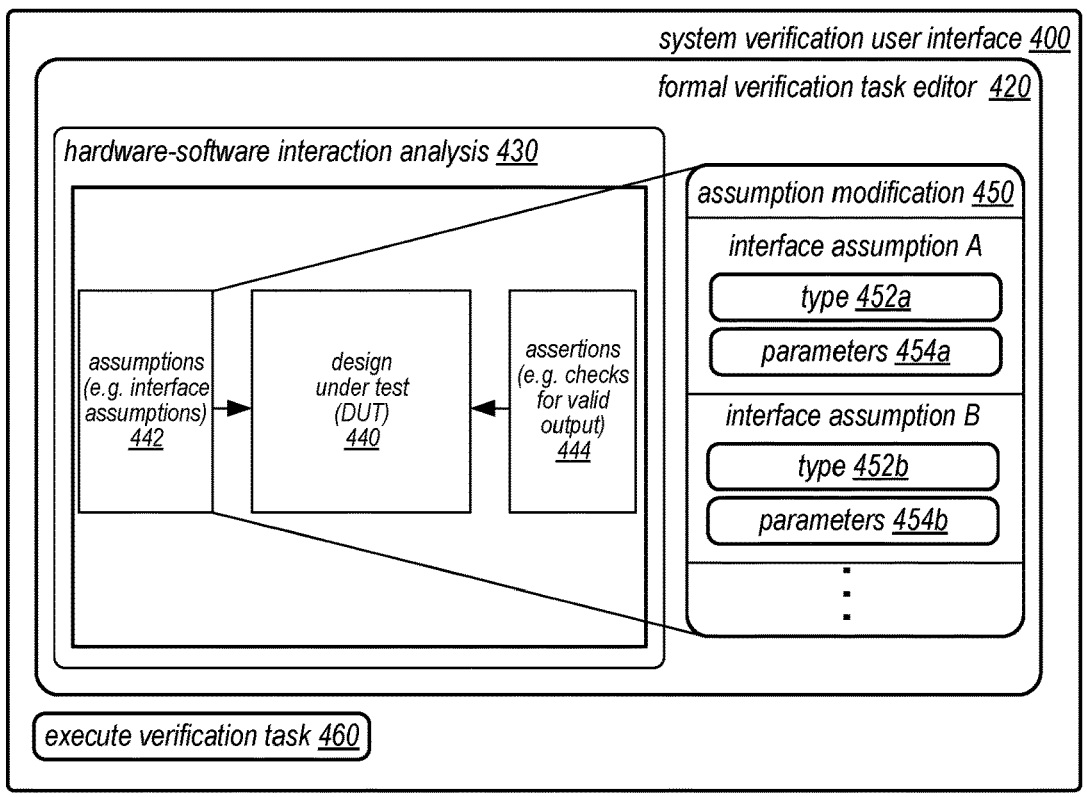
FIGS. 4A-4B are an example of an interface for creating and executing a verification task that performs hardware-software interaction testing using formal verification, according to some embodiments.
Figure 4B:
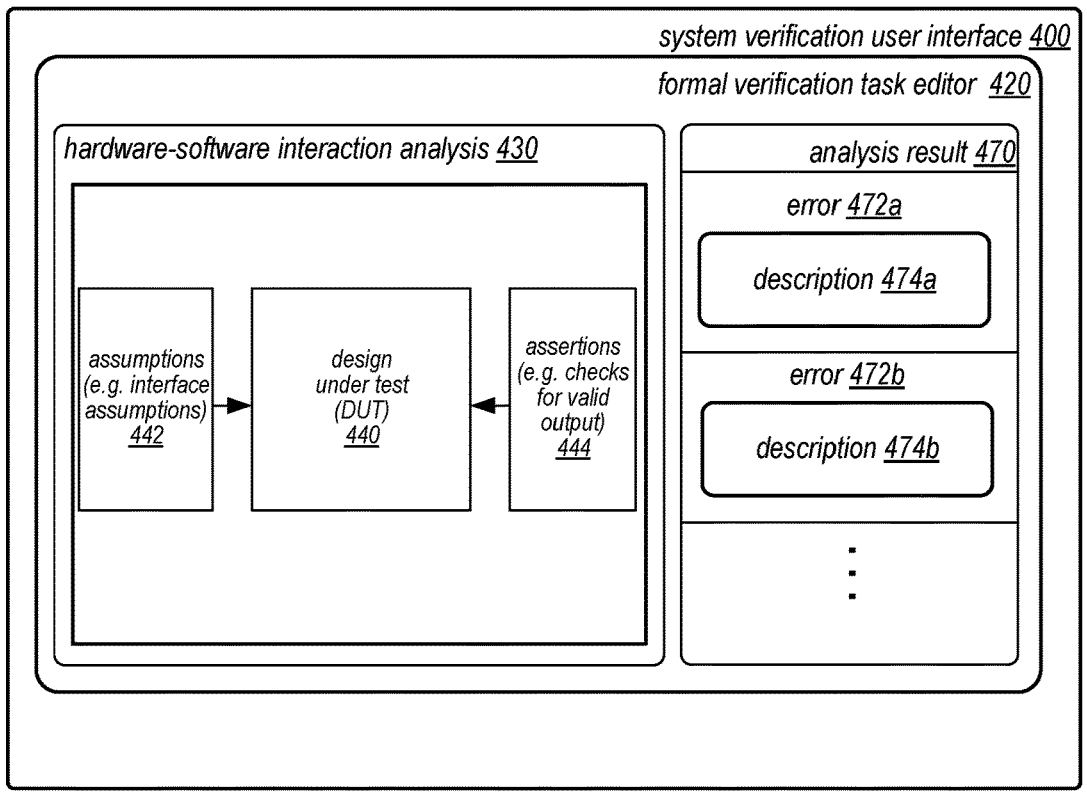

FIGS. 4A-4B are an example of an interface for creating and executing a verification task that performs hardware-software interaction testing using formal verification, according to some embodiments. System verification user interface 400 may be a graphical user interface implemented as part of interface 220 (e.g., as part of verification task editor 222), in some embodiments, to provide various different interface elements for creating, modifying, and/or executing a verification task that implements configuration space testing for design correctness using formal verification. For example, formal verification task editor 420 may be implement various menus, buttons, lists, drop-down boxes, selectors, text, inputs, upload mechanisms, and/or other graphical user interface elements to allow a user to create a verification task that can, for instance, perform hardware-software interaction testing, in some embodiments.

Formal verification task editor 420 may implement elements (not illustrated) to create or otherwise begin to specify a verification task. For instance, various templates or other verification task creation workflows may be presented. In some embodiments, a configuration space analysis 430 may be selected for creation, modification, and/or execution. A hardware design, specified according to a hardware language may be uploaded, written or created (e.g. as part of a text editor for creating hardware designs—not illustrated), such as design-under-test (DUT) 440. Different techniques for formal verification may be implemented, in various embodiments. In at least some of these techniques, different assumptions, such as assumptions 442, which may indicate valid access to a configuration space of DUT 440, and different assertions, such as assertions 444, which may indicate valid output from DUT, may be implemented for DUT 440.

In some embodiments, a user interface element may be implemented as part of formal verification task editor 420, such as assumption modification element 450, which may offer interface elements to specify interface assumptions for performing configuration space analysis 430. For example, interface assumption A may have a type 452*a* input and parameters 454*a* input. Similarly, interface assumption B may have a type 452*b* input and parameters 454*b* input. Different types of interface assumptions may be selected, such as types or parameters that identify allowed sequences, combinations, and/or data values for accessing configuration registers in a configuration space.

As indicated at 460, a user interface element may be implemented to cause the execution of the verification task that performs configuration space analysis 430. For example, the execution of the verification task may be performed to instantiate or otherwise create DUT 440 and begin formal verification using the assumptions 442 and assertions 444. FIG. 4B illustrates an analysis result 470 that may be displayed via system verification user interface 400. Analysis result 470 could be a pop-up window, integrated display area, link to or downloadable form of results (e.g., by identifying or downloading a result file, and so on). Analysis result 470 may include displays of individual errors, such as errors 472*a* and 472*b* along with respective descriptions 474*a* and 474*b* (which may provide a sequence of access to the configuration space that caused the error).

The examples discussed above with regard to FIGS. 1-4B have been given in regard to an example system verification application. Note that various other types or configurations of applications, including hardware development applications, may implement configuration space testing for design correctness using formal verification and thus may implement these techniques. In addition to examples given above, the techniques discussed below with regard to FIG. 6 may be also implemented using the various components discussed above as well as different types of systems or devices that perform formal verification on a hardware design.

Figure 5:
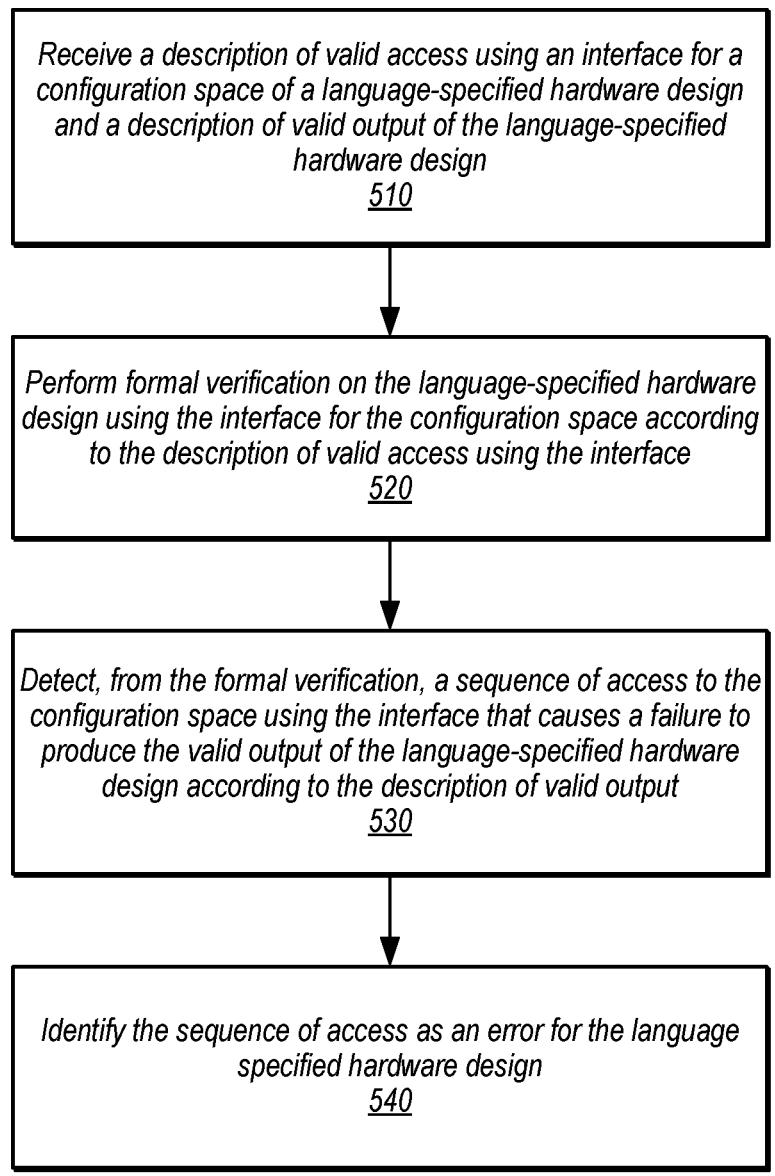
FIG. 5 is a high-level flowchart illustrating various methods and techniques to implement hardware-software interaction testing using formal verification, according to some embodiments.

FIG. 5 is a high-level flowchart illustrating various methods and techniques to implement hardware-software interaction testing using formal verification, according to some embodiments. A language-specified hardware design may be received, in various embodiments. For example, the hardware design may be specified according to a hardware language like System Verilog or VHSIC Hardware Definition Language (VHDL). The language-specified hardware design may be stored in a file, data object, data structure, or other portion of data that supports storing a language-specified hardware design, in some embodiments. In various embodiments, verification system may accept as a single verification task, job, or operation, the hardware design as part of a request to create, execute, initiate, or otherwise perform formal verification on the hardware design. As discussed above (e.g., with regard to FIGS. 1, 2, and 4A), a request may be a request to perform the configuration space correctness analysis for formal verification with environmental modifications). In some embodiments, a verification system library may implement or support a request as part of a script or other programmatic invocation (e.g., test code or other instructions for testing the language-specified hardware design) to perform the design correctness analysis (e.g., a function call to perform correctness analysis with supplied parameters for the different environmental assumptions).

As indicated at 510, a description of valid access using an interface for a configuration space of the language-specified hardware design may be received. This description may be received in various ways, similar to the description of the language-specified hardware design (e.g., accept as a single verification task, job, or operation, the hardware design as part of a request to create, execute, initiate, or otherwise perform formal verification on the hardware design). The description may, in some embodiments, be specified as one or more assumptions that describe the allowable locations or portions of the configuration space to write and/or read using the interface, allowable sequences for performing accesses, and/or allowable data values to write. As discussed above with regard to FIG. 1, the interface may be implemented as various protocols (e.g., APB) or other techniques for accessing the configuration space.

As indicated at 510, a description of valid output of the language-specified hardware design may be received. This description may be received in various ways, similar to the description of the language-specified hardware design and valid access using the interface for the configuration space (e.g., accept as a single verification task, job, or operation, the hardware design as part of a request to create, execute, initiate, or otherwise perform formal verification on the hardware design). The description may, in some embodiments, be specified as one or more assertions that can be evaluated to determine whether output of the language-specified hardware design (or lack of output form the language-specified hardware design) is valid. Valid output may conform to various protocols or other expected output behaviors for the hardware design being verified in some embodiments.

As indicated at 520, formal verification may be performed on the language-specified hardware design using the interface for the configurations pace according to the description of valid access using the interface, in various embodiments. For instance, formal verification may be begun in response to a request to execute or start formal verification of a verification task that includes both the language specified-hardware design, assertions describing valid output and assumptions describing valid access to a configuration space. In some embodiments, the verification task may include instructions or criteria that specifies how the performance of formal verification is to proceed (e.g., by updating assumptions and continuing or restarting formal verification using the updated assumptions) and/or to perform register selection techniques as discussed below with regard to FIG. 6.

As discussed above, various formal verification techniques may be performed to implement formal verification for the language-specified hardware design, in some embodiments. For example, some formal verification techniques may utilize inputs and/or internal variables for the hardware design being tested (e.g., the reference copy and the language-specified hardware design) have some constraints which may be specified by one or more assumptions (including interface assumptions) and one or more checks for validity on outputs or internal variables of the hardware design being tested specified by one or more assertions, in some embodiments. Formal verification techniques may translate or represent the assumptions, assertions, and other aspects of the reference copy and the language-specified hardware design as mathematical equations which can then be analyzed to identify if there is a sequence that creates a scenario that violates an assertion.

A sequence of access to the configuration space using the interface that causes a failure to produce the valid output of the language specified hardware design according to the description of valid output may be detected, in various embodiments, as indicated at 530. For example, transformation of the hardware design and assumptions into a mathematical model may identify one (or more) different access sequences (e.g., of one or more configuration registers) as well as data values that cause a failure to produce valid output (e.g., no output or erroneous output). Multiple sequence of access to the configuration space can be detected as configuration space errors, in some embodiments.

As indicated at 540, the sequence of access may be identified as an error for the language-specified hardware design, in some embodiments. For example, the sequence of access may be added to a result display and/or recorded/ stored in a result store or data set that describes errors detected for the language-specified hardware design. In some embodiments, the identification of the sequence may include the sequence of portions accessed (and values written in some scenarios) in the configuration space. For example, the sequence may be specified as an order of address and data values written to configuration registers.

Figure 6:
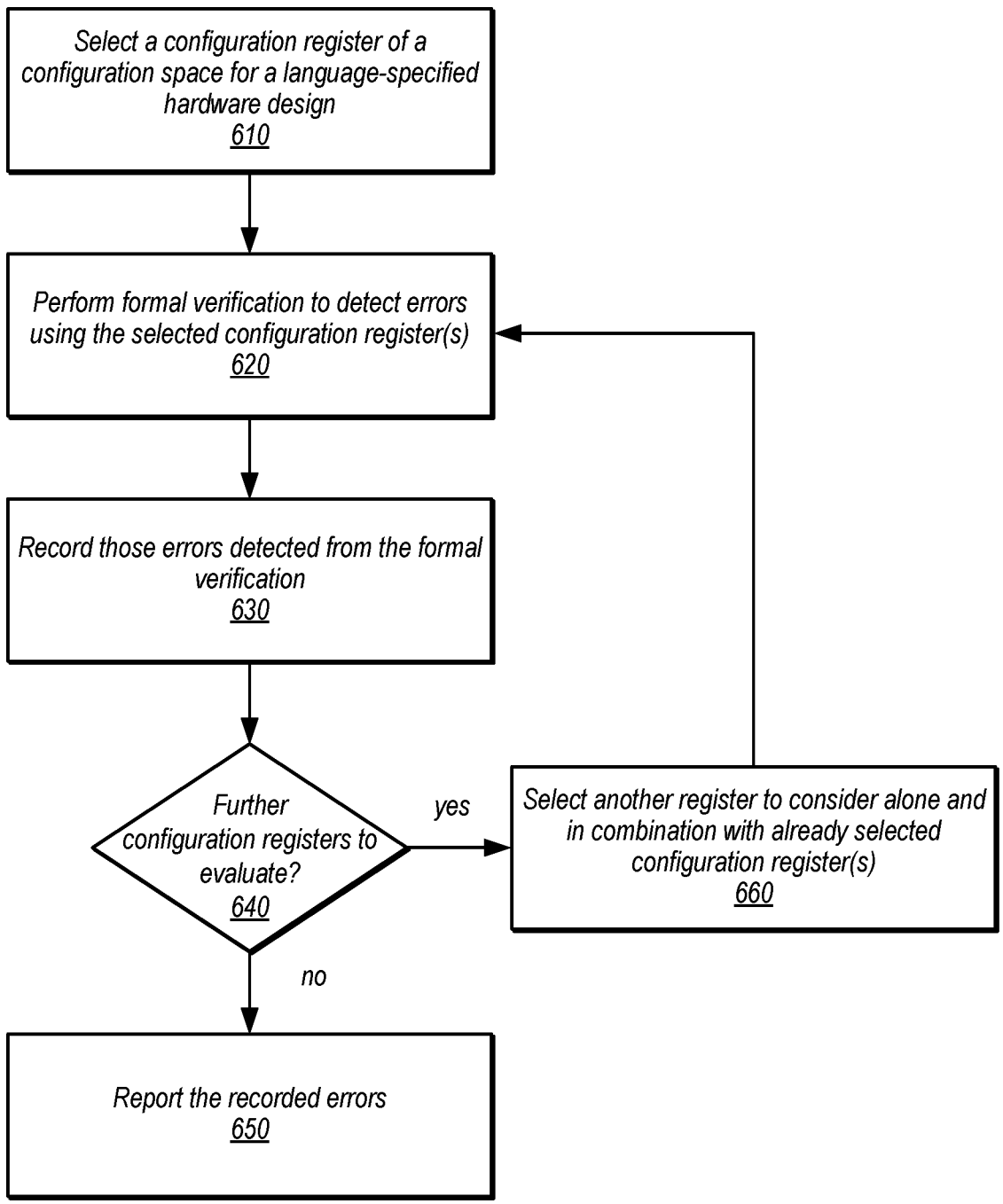
FIG. 6 is a high-level flowchart illustrating various methods and techniques to implement selecting different combinations of configuration registers for access testing using formal verification, according to some embodiments.

Different evaluation patterns for considering access to configuration space may be performed. For example, different orderings and selections of configuration registers may be performed. FIG. 6 is a high-level flowchart illustrating various methods and techniques to implement selecting different combinations of configuration registers for access testing using formal verification, according to some embodiments. As indicated at 610, a configuration register of a configuration space for a language-specified hardware design may be selected, in some embodiments. For example, the configuration register may be the first of multiple configuration registers. As indicated at 620, formal verification to detect configuration space errors may be performed using the selected configuration register, in some embodiments. Those errors that are detected may be recorded in some embodiments.

Configuration register selection may be performed to iterate through and select configuration registers in order to check different configuration registers and combinations of configuration registers (e.g., check individual registers, check pairs of registers, check triplets of registers, and so on). As indicated, if further configuration registers are available to evaluate, then as indicated by the positive exit from 640, another register maybe selected to consider alone and in combination with already selected configuration registers (e.g., alone or in combination as a pair with the first configuration register), as indicated at 660. In this way, the loop back from 660 through elements 620, 630, and 640 may continue until each combination of configuration registers is evaluated. If no further registers remain to evaluate, then as indicated at 650, the recorded errors may be reported (e.g., via an interface).

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

Figure 7:
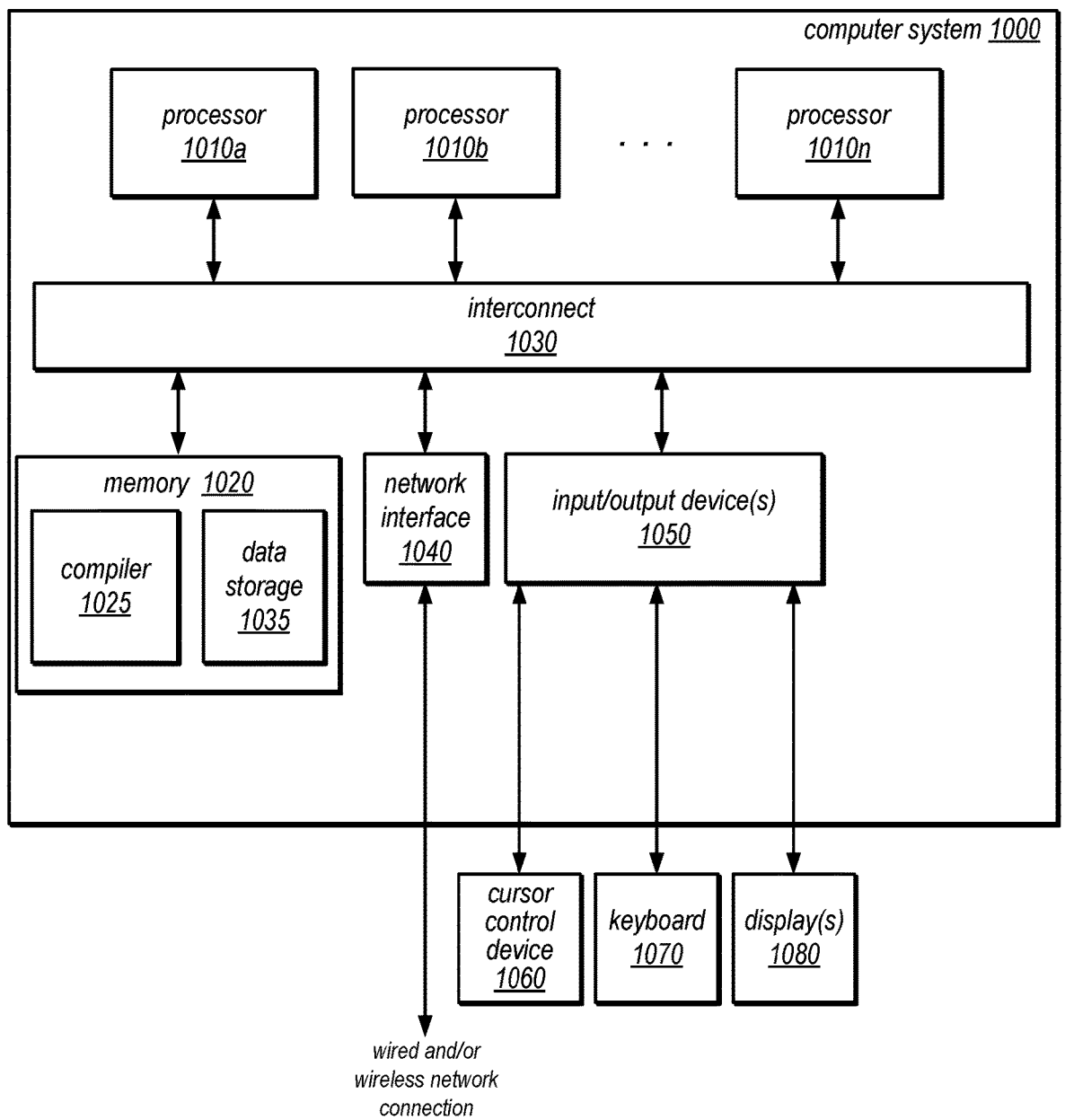
FIG. 7 is an example computer system, according to some embodiments.

Embodiments of hardware-software interaction testing using formal verification as discussed above may be implemented as part of a computer system. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions, such as program instructions to implement a compiler 1025 (like compiler 240 discussed above with regard to FIG. 2 as well as other features or all of development application 210) and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    one or more processors;
    a memory, storing program instructions that when executed by the one or more processors cause the one or more processors to implement a verification system, the verification system configured to:
        receive a first description of valid access of configuration space using an interface for a plurality of configuration registers of a language-specified hardware design, and receive a second description of valid output of the language-specified hardware design;
        receive a request to perform formal verification on the language-specified hardware design using the interface for the plurality of configuration registers according to the first description;
        responsive to the request, perform formal verification using the interface for the configuration registers according to the first description,
        wherein the performance of formal verification detects a sequence of access to the configuration registers, using the interface, that causes a denial of service failure to produce the valid output of the language-specified hardware design according to the second description; and
        in response to the detection of the sequence of access to the configuration registers using the interface that causes the denial of service failure, record the sequence of access as an error for the language-specified hardware design.

2. The system of claim 1, wherein the verification system is further configured to:
    update the first description of the valid access using the interface for the plurality of configuration registers to prevent the error; and
    perform formal verification using the interface for the configuration registers according to the updated first description.

3. The system of claim 1, wherein to perform formal verification using the interface for the configuration registers according to the first description, the verification system is configured to iterate through different combinations of the plurality of configuration registers to perform the formal verification.

4. The system of claim 1, wherein the verification system is further configured to provide the error for the language-specified hardware design as a response to the request.

5. A method, comprising:
    receiving, at a verification system, a first description of valid access using an interface for a configuration space of a language-specified hardware design and a second description of valid output of the language-specified hardware design;
    performing, by the verification system, formal verification on the language-specified hardware design using the interface for the configuration space according to the first description, wherein the performance of formal verification detects a sequence of access to the configuration space using the interface that causes a failure to produce the valid output of the language-specified hardware design according to the second description; and in response to detecting the sequence of access to the configuration space using the interface that causes the failure, identifying, by the verification system, the sequence of access as an error for the language-specified hardware design.

6. The method of claim 5, further comprising:
updating, by the verification system, the first description of the valid access using the interface for the configuration space to prevent the error; and
performing, by the verification system, formal verification using the interface for the configuration space according to the updated first description.

7. The method of claim 5, wherein the performing formal verification on the language-specified hardware design using the interface for the configuration space according to the first description comprises iterating through different combinations of the plurality of configuration registers to perform the formal verification.

8. The method of claim 5, further comprising providing the error via a user interface for the verification system, and wherein the first description and the second description were received through the user interface.

9. The method of claim 5, further comprising receiving, by the verification system, the language-specified hardware design as part of a request to create a verification task to be performed by the verification system.

10. The method of claim 5, further comprising receiving, by the verification system, a request to perform formal verification on the language-specified hardware design using the interface for the configuration space according to the first description and wherein formal verification is performed in response to the request.

11. The method of claim 5, further comprising:
receiving, by the verification system, an update to the first description of the valid access using the interface for the configuration space to prevent the error; and
responsive to a second request to perform formal verification using the interface for the configuration space, performing, by the verification system, formal verification using the interface for the configuration space according to the updated first description.

12. The method of claim 5, wherein the failure to produce the valid output stops the language-specified hardware design from producing output within a period of time.

13. The method of claim 5, wherein the sequence of access to the configuration space using the interface that causes the failure is a sequence of writes, caused by a hosted software process, to different configuration registers in the configuration space.

14. One or more non-transitory, computer-readable storage media, storing program instructions that when executed on or across one or more computing devices cause the one or more computing devices to implement at least:
receiving a first description of valid access using an interface for a configuration space of a language-specified hardware design and a second description of valid output of the language-specified hardware design;
receiving a request to perform formal verification on the language-specified hardware design using the interface for the configuration space according to the first description;
detecting, as part of performing formal verification, a sequence of access to the configuration space using the interface that causes a failure to produce the valid output of the language-specified hardware design according to the second description; and
in response to detecting the sequence of access to the configuration space using the interface that causes the failure, identifying the sequence of access as an error for the language-specified hardware design.

15. The one or more non-transitory, computer-readable storage media of claim 14, storing further instructions that when executed on or across the one or more computing devices cause the one or more computing devices to further implement:
receiving an update to the first description of the valid access using the interface for the configuration space to prevent the error; and
responsive to a second request to perform formal verification using the interface for the configuration space, performing formal verification using the interface for the configuration space according to the updated first description.

16. The one or more non-transitory, computer-readable storage media of claim 14, wherein the error indicates a security vulnerability that allows a first software process to write to the configuration space causing the failure.

17. The one or more non-transitory, computer-readable storage media of claim 14, wherein the performance of formal verification on the language-specified hardware design using the interface for the configuration space according to the first description iterates through different combinations of the plurality of configuration registers to perform the formal verification.

18. The one or more non-transitory, computer-readable storage media of claim 14, storing further instructions that when executed on or across the one or more computing devices cause the one or more computing devices to further implement displaying the error via a user interface for the verification system, and wherein the first description and the second description was received through the user interface.

19. The one or more non-transitory, computer-readable storage media of claim 14, storing further instructions that when executed on or across the one or more computing devices cause the one or more computing devices to further implement providing the error for the language-specified hardware design as a response to the request.

20. The one or more non-transitory, computer-readable storage media of claim 14, storing further instructions that when executed on or across the one or more computing devices cause the one or more computing devices to further implement:
updating the first description of the valid access using the interface for the configuration space to prevent the error; and
performing formal verification using the interface for the configuration space according to the updated first description.

* * * * *